United States Patent
Cross

(10) Patent No.: US 11,904,776 B2
(45) Date of Patent: Feb. 20, 2024

(54) VEHICLE STORAGE ATTACHMENT DEVICE

(71) Applicant: Peter Cross, Kailua, HI (US)

(72) Inventor: Peter Cross, Kailua, HI (US)

(*) Notice: Subject to any disclaimer, the term of this patent is extended or adjusted under 35 U.S.C. 154(b) by 189 days.

(21) Appl. No.: 17/714,679

(22) Filed: Apr. 6, 2022

(65) Prior Publication Data

US 2023/0322163 A1 Oct. 12, 2023

(51) Int. Cl.
*B60R 11/00* (2006.01)
*B60N 3/00* (2006.01)

(52) U.S. Cl.
CPC .............. *B60R 11/00* (2013.01); *B60N 3/002* (2013.01); *B60R 2011/0007* (2013.01); *B60R 2011/0012* (2013.01); *B60R 2011/0059* (2013.01)

(58) Field of Classification Search
CPC ............. B60R 7/043; B60R 2011/0007; B60R 2011/0012; B60N 3/002
See application file for complete search history.

(56) References Cited

U.S. PATENT DOCUMENTS

| | | | |
|---|---|---|---|
| 8,162,189 B2 | 4/2012 | Robins | |
| 8,282,161 B1 | 10/2012 | Jacobson | |
| 9,174,561 B1 | 11/2015 | Ferlisi Wilson | |
| 9,598,021 B2* | 3/2017 | Noonan | ..................... B60R 7/04 |
| 9,868,375 B1 | 1/2018 | Kachel | |
| 9,981,610 B2 | 5/2018 | Robins | |
| 10,190,339 B1* | 1/2019 | Mack | .................. E05B 73/0005 |
| 10,689,886 B2* | 6/2020 | Mack | ......................... B60R 7/14 |
| 11,628,759 B2* | 4/2023 | Hahm | ................... B60N 2/6009 |
| | | | 297/182 |
| D991,144 S * | 7/2023 | Pan | .............................. D12/422 |
| 11,815,756 B2* | 11/2023 | Matsumoto | ............... G09F 9/33 |
| 2006/0081669 A1* | 4/2006 | Rissler | ................ B60R 11/0258 |
| | | | 224/42.32 |
| 2008/0272166 A1 | 11/2008 | Frank | |
| 2014/0367396 A1 | 12/2014 | Schmalz | |
| 2023/0322163 A1* | 10/2023 | Cross | ...................... B60R 11/00 |
| | | | 224/558 |

* cited by examiner

*Primary Examiner* — Justin M Larson

(57) ABSTRACT

A vehicle storage attachment device for having a plurality of hooks on center console attachment includes a base. An arm protrudes from the base. A plurality of f-clips can be secured to the arm. Furthermore, a c-clip having an anchor can be secured to the arm. The base is nested within a cavity of a sleeve. The sleeve has a pair of sides, and each of the sides has a pair of spacers. The pair of spacers of each of the sides retains the sleeve in a fixed position between the bucket seats to a center console of a vehicle. A tray is positioned on a top surface of the sleeve and provides an interior space for a variety of items to be stored within. A variety of attachments can be latched to each of the f-clips when in-use.

11 Claims, 6 Drawing Sheets

VEHICLE STORAGE ATTACHMENT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to vehicle bucket seat pocket devices and more particularly pertains to a new vehicle bucket seat pocket device for having a plurality of hooks on center console attachment.

(2) Description of Related Art Including Information Disclosed Under 37 CFR 1.97 and 1.98

The prior art relates to vehicle bucket seat pocket devices. The prior art relates to a variety of vehicle bucket seat pocket devices being nested between each of the bucket seats with the center console. Known prior art lacks a vehicle bucket seat pocket device having an arm and anchor to attach to the center console with a plurality of hooks to secure to the arm.

BRIEF SUMMARY OF THE INVENTION

An embodiment of the disclosure meets the needs presented above by generally comprising a base. The base has an arm protruding out from the base. A sleeve has a cavity that defines a space for the base to be nested within. The sleeve has a pair of sides whereby each of the sides has a pair of spacers. The pair of spacers of each of the sides is configured for retaining the sleeve in a fixed position by the lateral pressure from the bucket seats of the vehicle. A tray is positioned on a top surface of the sleeve and has an interior space that defines an area for a variety of items to be stored within. Each f-clip of a plurality of f-clips has a top hook and a bottom hook. The top hook is configured for being positioned on a top edge of the arm whereby securing each of the f-clips to the arm. The bottom hook of each of the f-clips is configured for securing to a variety of attachments. A c-clip has the top hook and the bottom hook. The top hook of the c-clip secures to the top edge of the arm. Furthermore, the c-clip has an anchor being configured for securing to a center console of a vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
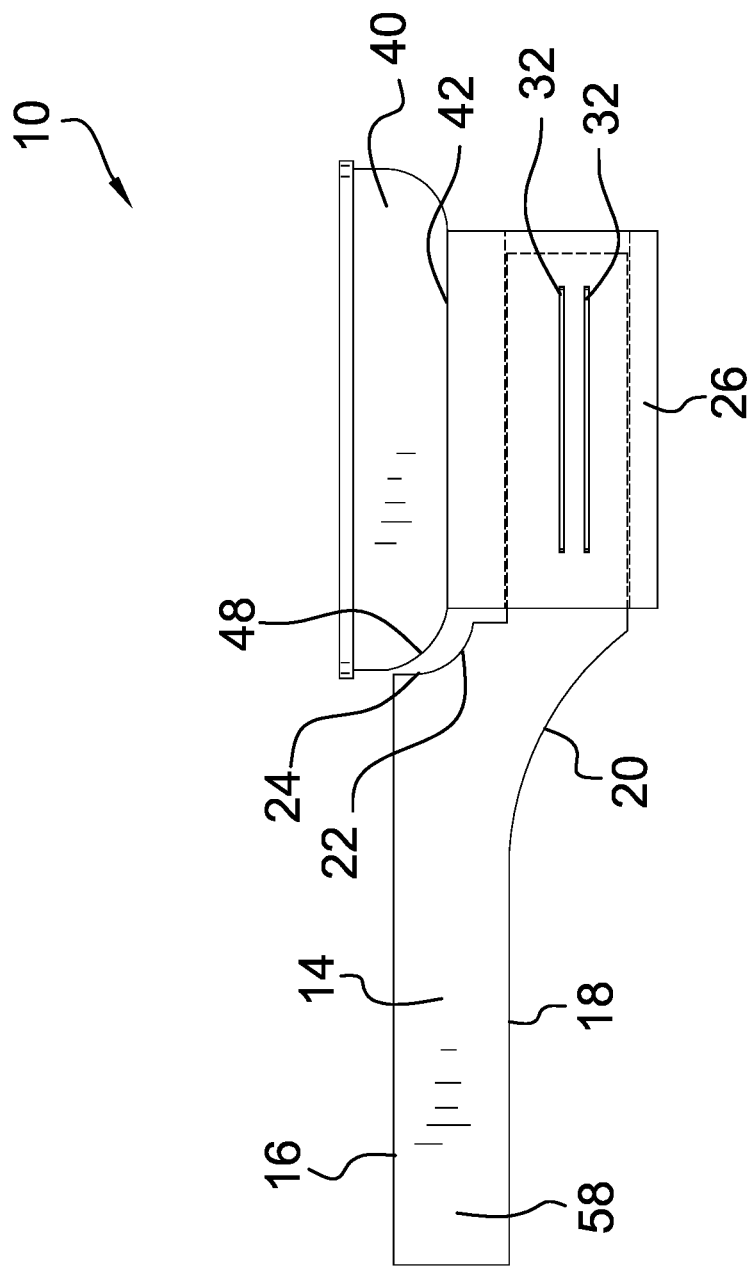
FIG. 1 is a front view of a vehicle storage attachment device according to an embodiment of the disclosure.
Figure 3:
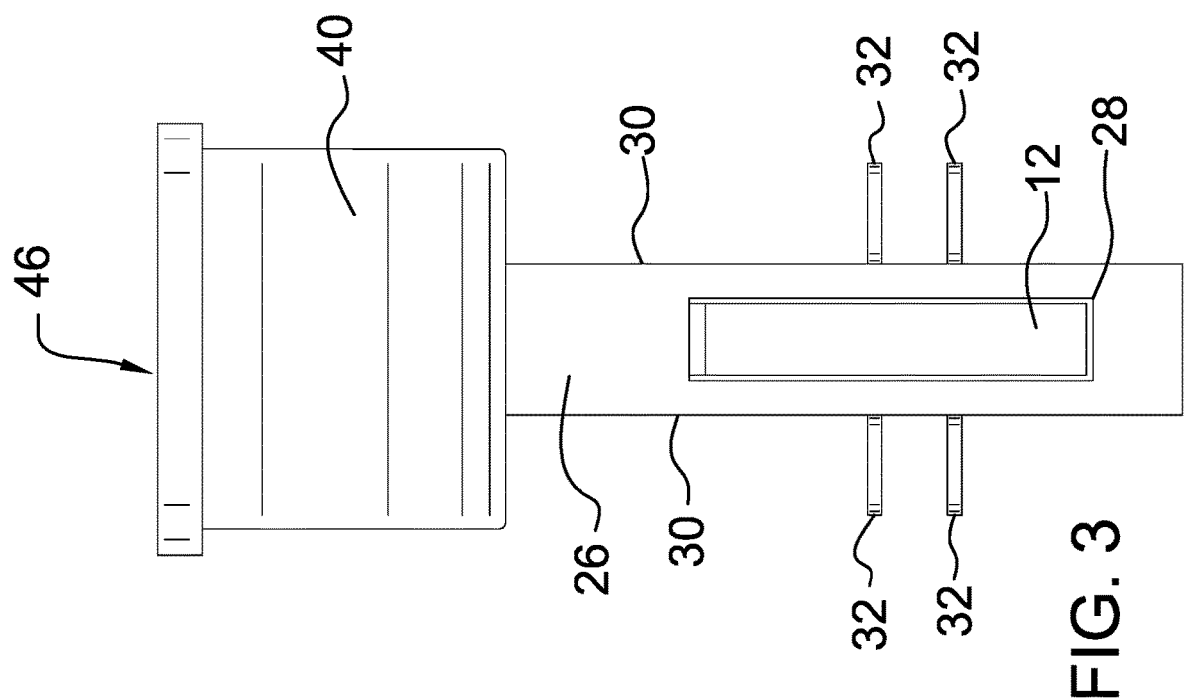
FIG. 3 is a right side view of an embodiment of the disclosure.
Figure 2:
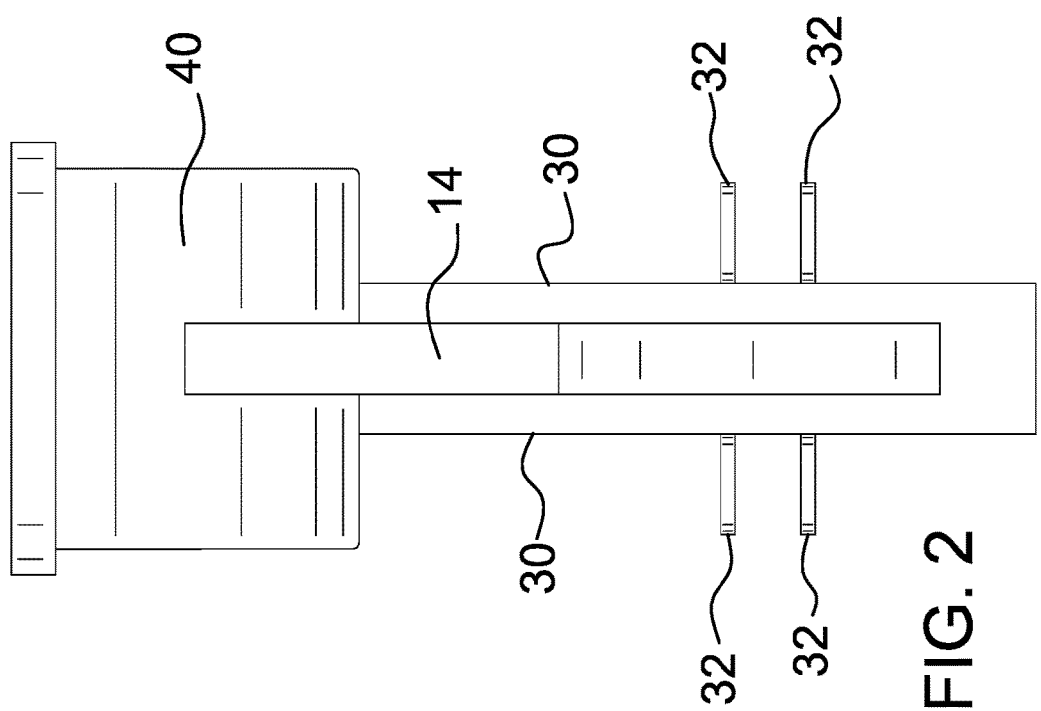
FIG. 2 is a left side view of an embodiment of the disclosure.
Figure 4:
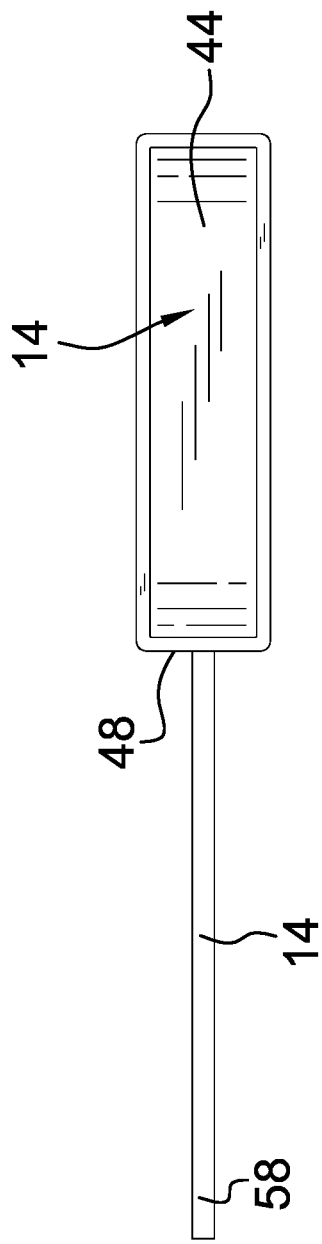
FIG. 4 is a top view of an embodiment of the disclosure.
Figure 5:
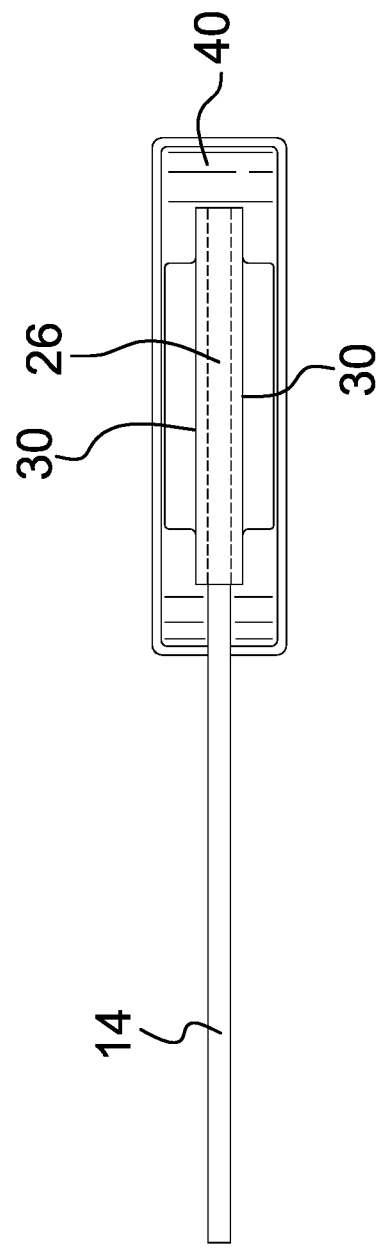
FIG. 5 is a bottom view of an embodiment of the disclosure.
Figure 6:
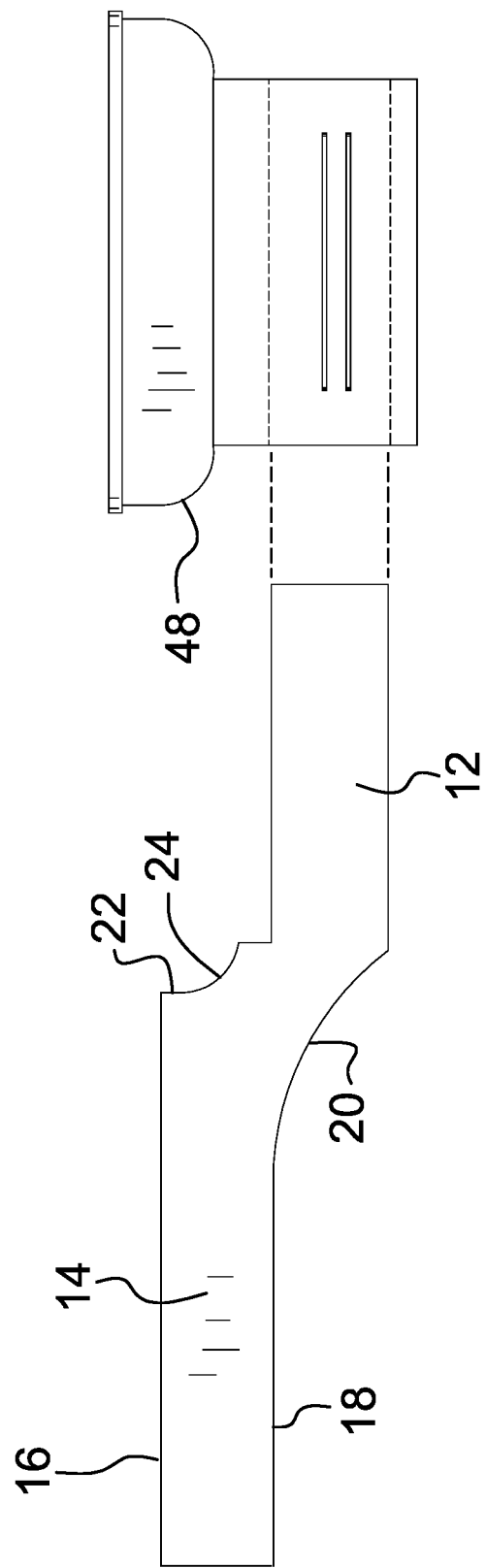
FIG. 6 is an exploded view of an embodiment of the disclosure.

With reference now to the drawings, and in particular to FIGS. 1 through 8 thereof, a new vehicle bucket seat pocket device embodying the principles and concepts of an embodiment of the disclosure and generally designated by the reference numeral 10 will be described.

Figure 7:
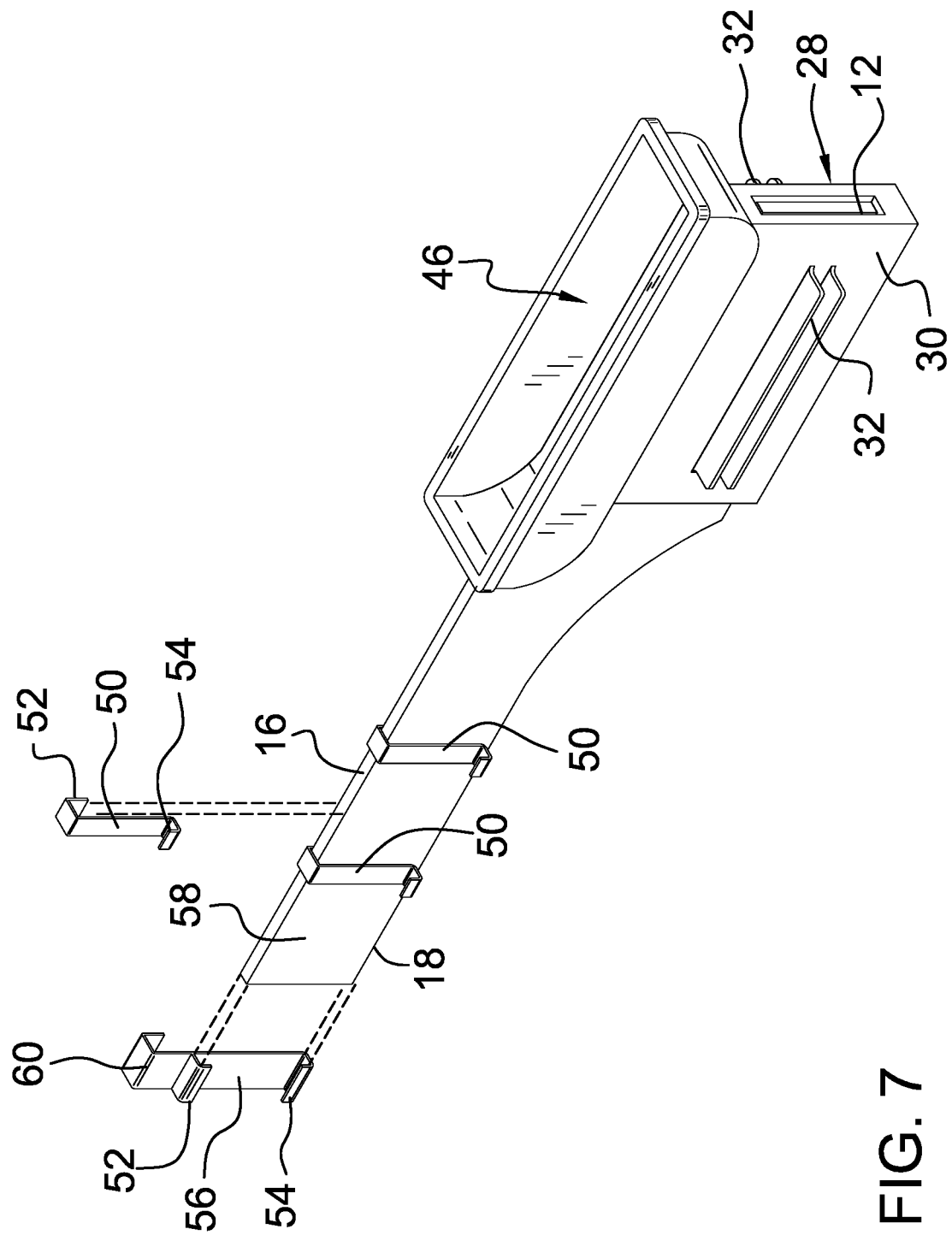
FIG. 7 is an exploded view of an embodiment of the disclosure.
Figure 8:
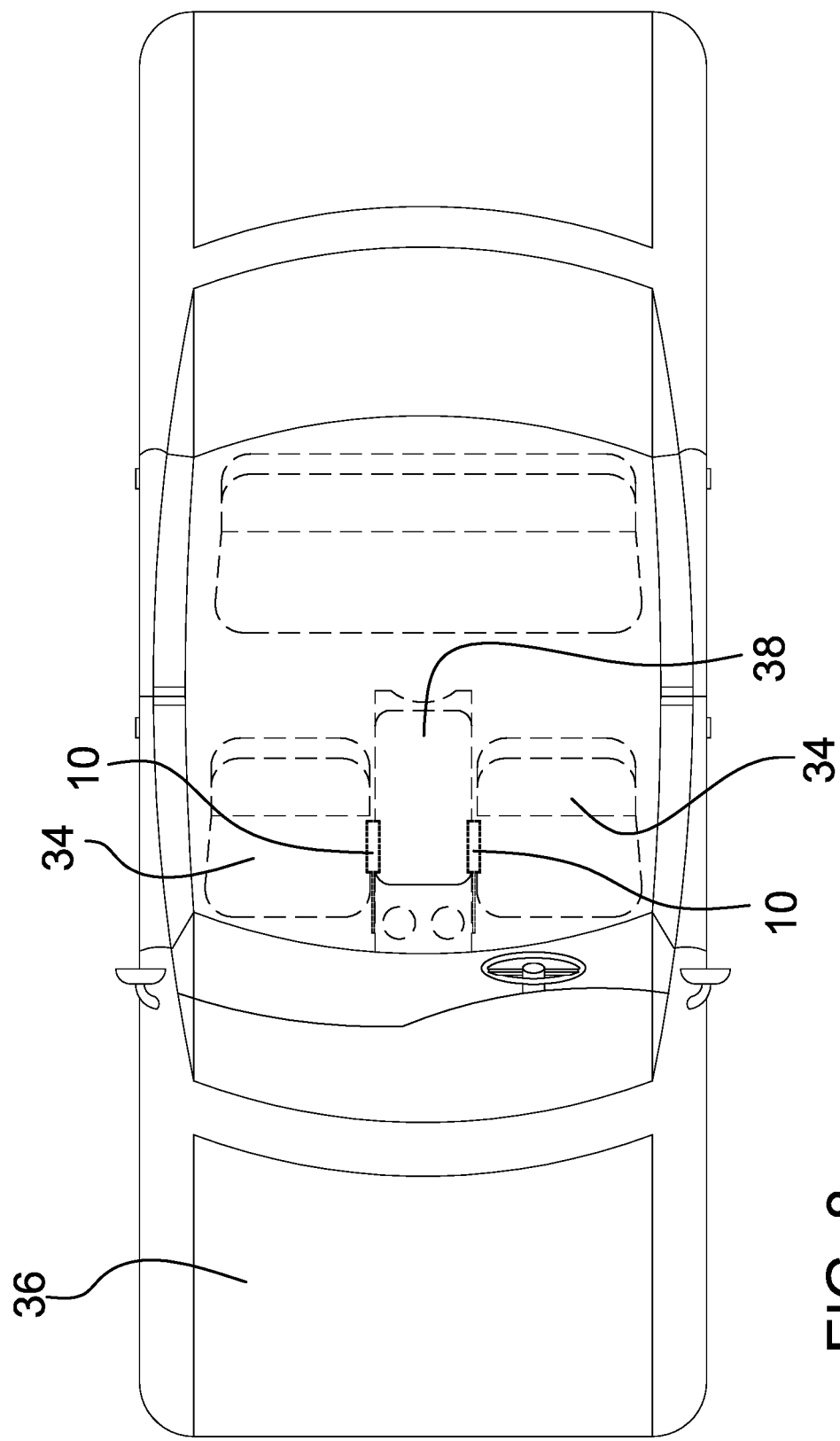
FIG. 8 is an in-use view of an embodiment of the disclosure.

As best illustrated in FIGS. 1 through 8, the vehicle storage attachment device 10 generally comprises a base 12 with a rectangular prism shape. The base 12 has an arm 14 protruding outward from a side of the base 12. Furthermore, the arm 14 is positioned coplanar to the base 12, as shown in FIG. 7. The arm 14 has a top edge 16 and a lower edge 18. The lower edge 18 of the arm 14 has a concave curvature 20 that defines upward shape to the arm 14. The arm 14 has a base edge 22 positioned proximate to the base 12. The base edge 22 has a cut out 24 defining a place for an element to be positioned against.

A sleeve 26 has a rectangular prism shape with a cavity 28. The cavity 28 defines a space for the base 12 to be nested within. The base 12 can be inserted and removed from the cavity 28 of the sleeve 26. The sleeve 26 has a pair of sides 30, and each of the sides 30 has a pair of spacers 32. Each of the spacers 32 is protruding out from the sleeve 26 and each of the spacers 32 is positioned perpendicular relative to the pair of sides 30. The pair of spacers 32 of each of the sides 30 is configured to retain the sleeve 26 in a fixed position from the lateral pressure of the bucket seats 34 of the vehicle 36. The sleeve 26 can be removed or inserted in between a bucket seat 34 and a center console 38.

A tray 40 is positioned on a top surface 42 of the sleeve 26. The tray 40 has a semi oval shape with an interior space 42. The interior space 44 defines an area for a variety of items to be stored within. The interior space 44 of the tray 40 can be accessed from an open top 46 of the tray 40. The tray 40 has an edge 48 configured for being positioned within the cut out 24 of the base edge 22 of the arm 14. The cut out 24 of the base edge 22 helps provide stability to the tray 40 upon the top surface 42 of the sleeve 26.

A plurality of f-clips 50 is positioned on the arm 14. Each of the f-clips 50 has a top hook 52 and a bottom hook 54. The top hook 52 of each of the f-clips 50 is configured for being positioned on the top edge 16 of the arm 14 whereby securing each of the f-clips 50 to the arm 14. The bottom hook 54 of each of the f-clips 50 is configured for securing to a variety of attachments. The bottom hook 54 of each of the f-clips 50 is positioned facing away from the lower edge 18 of the arm 14. The variety of attachments to be secured to each of the f-clips 50 includes lanyards, small pockets, pen-holding tubes, and cord-holding tubes.

A c-clip 56 is positioned at an end 58 of the arm 14. The c-clip 56 has the top hook 52 and the bottom hook 54, whereby the top hook 52 secures to the top edge 16 of the arm 14. The bottom hook 54 of the c-clip 56 secures to the lower edge 18 of the arm 14, in contrast to each of the f-clips 50. An anchor 60 is positioned above the top hook 52 of the c-clip 56. The anchor 60 is a hook being configured for securing to the center console 38 of the vehicle 36. The c-clip 56 is used to provide supplementary support to the vehicle storage attachment device 10.

In use, the base 12 is inserted into the cavity 28 of the sleeve 26. The c-clip 56 can be secured to the end 58 of the arm 14. Subsequently, the anchor 60 of the c-clip 56 can be secured to the center console 38 of the vehicle 36, whereby the sleeve 26 is inserted in between the bucket seat 34 and the center console 38. The pair of spacers 32 of each of the sides 30 of the sleeve 26 retains the sleeve 26 in a fixed position. Each of the f-clips 50 can be secured to the top edge 16 of the arm 14 such that a variety of attachments can be latched onto the bottom hook 54 of each of the f-clips 50.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle storage attachment device comprising:
   a base having an arm, the arm protruding out from the base, the arm having a lower edge;
   a sleeve having a cavity, the cavity defining a space for the base to be nested within, the sleeve having a pair of sides, each of the sides having a pair of spacers, the pair of spacers of each of the sides being configured for retaining the sleeve in a fixed position by the lateral pressure from the bucket seats of the vehicle;
   a tray being positioned on a top surface of the sleeve, the tray having an interior space, the interior space defining an area for a variety of items to be stored within;
   a plurality of f-clips, each of the f-clips having a top hook and a bottom hook, the top hook of each of the f-clips being configured for being positioned on a top edge of the arm whereby securing each of the f-clips to the arm, the bottom hook of each of the f-clips being configured for securing to a variety of attachments; and
   a c-clip having a top hook and the bottom hook, the top hook of the c-clip being configured for securing to the top edge of the arm, the c-clip having an anchor, the anchor being configured for securing to a center console of the vehicle.

2. The vehicle storage attachment device of claim 1, further comprising the base being a rectangular prism shape.

3. The vehicle storage attachment device of claim 1, further comprising the lower edge of the arm having a concave curvature.

4. The vehicle storage attachment device of claim 1, further comprising the arm having base edge, the base edge of the arm having a cut out, the cut out of the base edge defining a place for an element to be positioned against.

5. The vehicle storage attachment device of claim 1, further comprising the sleeve being a rectangular prism shape.

6. The vehicle storage attachment device of claim 1, further comprising each of the spacers of each of the sides protruding out from the sleeve, each of the spacers being positioned perpendicular relative to each of the sides of the sleeve.

7. The vehicle storage attachment device of claim 1, further comprising the tray having a semi oval shape.

8. The vehicle storage attachment device of claim 1, further comprising an edge of the tray being configured for being positioned within the cut out of the base edge of the arm.

9. The vehicle storage attachment device of claim 1, further comprising the bottom hook of the c-clip being configured for securing to the lower edge of the arm.

10. The vehicle storage attachment device of claim 1, further comprising the anchor being a hook positioned above the top hook of the c-clip.

11. A vehicle storage attachment device comprising:
    a base being a rectangular prism shape, the base having an arm, the arm protruding out from the base, the arm having a lower edge, the lower edge of the arm having a concave curvature, the arm having base edge, the base edge of the arm having a cut out, the cut out of the base edge defining a place for an element to be positioned against;
    a sleeve being a rectangular prism shape, the sleeve having a cavity, the cavity defining a space for the base to be nested within, the sleeve having a pair of sides, each of the sides having a pair of spacers, each of the spacers of each of the sides protruding out from the sleeve, each of the spacers being positioned perpendicular relative to each of the sides of the sleeve, the pair of spacers of each of the sides being configured for retaining the sleeve in a fixed position by the lateral pressure from the bucket seats of the vehicle;

a tray being positioned on a top surface of the sleeve, the tray having a semi oval shape, the tray having an interior space, the interior space defining an area for a variety of items to be stored within, an edge of the tray being configured for being positioned within the cut out of the base edge of the arm;

a plurality of f-clips, each of the f-clips having a top hook and a bottom hook, the top hook of each of the f-clips being configured for being positioned on a top edge of the arm whereby securing each of the f-clips to the arm, the bottom hook of each of the f-clips being configured for securing to a variety of attachments; and a c-clip having a top hook and the bottom hook, the top hook of the c-clip being configured for securing to the top edge of the arm, the bottom hook of the c-clip being configured for securing to the lower edge of the arm, the c-clip having an anchor, the anchor being a hook positioned above the top hook of the c-clip, the anchor being configured for securing to a center console of the vehicle.

* * * * *